(12) United States Patent  
Lee

(10) Patent No.: US 7,140,123 B2
(45) Date of Patent: Nov. 28, 2006

(54) ROLLER AND CLOTHES DRYING APPARATUS PROVIDED WITH THE SAME

(75) Inventor: Jung Ho Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/911,622

(22) Filed: Aug. 5, 2004

(65) Prior Publication Data

US 2005/0097772 A1    May 12, 2005

(30) Foreign Application Priority Data

Nov. 7, 2003    (KR) ...................... 10-2003-0078740
Nov. 7, 2003    (KR) ...................... 10-2003-0078741

(51) Int. Cl.
  *F26B 11/02*    (2006.01)
(52) U.S. Cl. ....................................... 34/601
(58) Field of Classification Search .................. 34/601,
  34/602, 603, 604, 605, 606; 68/131; 144/208.9;
  241/182
  See application file for complete search history.

(56) References Cited

U.S. PATENT DOCUMENTS

| | | | | |
|---|---|---|---|---|
| 2,706,899 A | * | 4/1955 | Meyer | ........................ 68/23.5 |
| 2,823,962 A | * | 2/1958 | Leonard | ...................... 384/125 |
| 3,783,918 A | * | 1/1974 | Simpson et al. | ......... 144/208.9 |
| 3,830,553 A | * | 8/1974 | Schurger et al. | ............ 384/613 |
| 4,234,237 A | * | 11/1980 | Kiriazaros | ................... 384/125 |
| 5,088,534 A | * | 2/1992 | Engel | ......................... 152/208 |
| 5,104,201 A | * | 4/1992 | Ross | ....................... 301/110.5 |
| 6,109,675 A | * | 8/2000 | Sumrall | ...................... 293/118 |
| 6,189,639 B1 | * | 2/2001 | Fuse et al. | ................... 180/231 |
| 2004/0200296 A1 | * | 10/2004 | Dummer | .................. 73/863.01 |

FOREIGN PATENT DOCUMENTS

JP    8-240385    9/1996

* cited by examiner

*Primary Examiner*—S. Gravini
(74) *Attorney, Agent, or Firm*—Staas & Halsey LLP

(57) ABSTRACT

A roller capable of easily absorbing impact transmitted thereto while maintaining a desired level of abrasion resistance, and a clothes drying apparatus provided with the roller. The roller is provided with an impact absorption enhancer capable of causing the roller to be easily elastically deformable while maintaining a desired hardness of the roller. Accordingly, it is possible to absorb intensive impact transmitted to the roller while maintaining a desired abrasion resistance of the roller.

8 Claims, 6 Drawing Sheets

ROLLER AND CLOTHES DRYING APPARATUS PROVIDED WITH THE SAME

CROSS-REFERENCE TO RELATED APPLICATIONS

This application claims the benefit of Korean Patent Application No. 2003-78740 filed on Nov. 7, 2003, and Korean Patent Application No. 2003-78741, filed on Nov. 7, 2003, in the Korean Intellectual Property Office, the disclosures of which are incorporated herein by reference.

BACKGROUND OF THE INVENTION

1. Field of the Invention

The present invention relates to a roller and a clothes drying apparatus provided with the roller, and, more particularly, to a clothes drying apparatus provided with rollers exhibiting high abrasion resistance while being easily elastically deformable.

2. Description of the Related Art

Generally, a clothes drying apparatus forcibly blows hot air into a drying tub, thereby drying wet clothes contained in the drying tub. That is, the clothes drying apparatus dries the clothes by forcibly circulating, by a fan, air heated by a heater into the drying tub.

A conventional clothes drying apparatus includes a housing provided with a door at a front wall thereof and a heater at a rear wall thereof, a drying tub mounted in the housing, a hot air intake duct arranged at the rear wall of the housing to guide hot air generated around the heater into the drying tub, and a hot air exhaust duct adapted to guide exhaustion of the hot air from the drying tub.

In order to elastically support the drying tub under the condition in which clothes are contained in the drying tub in an amount larger than an appropriate amount, the conventional clothes drying apparatus also includes rollers rotatably mounted to the housing beneath the drying tub to support a peripheral wall of the drying tub.

Each roller has a peripheral portion made of an elastically deformable material to elastically support the drying tub. Where a soft material, which is easily elastically deformable, is used for the rollers, effectively absorbing intensive impact transmitted from the drying tub is possible, thereby preventing damage to hinge shafts to hingably couple the rollers to the housing. In this case, however, there is a problem in that the rollers may be easily abraded due to low abrasion resistance thereof. On the other hand, where a hard material having high hardness, and thus, high abrasion resistance, is used, the rollers may not easily be abraded even after prolonged use. In this case, however, effectively absorbing impact transmitted from the drying tub is difficult, so that there may be a problem in that the hinge shafts to hingably couple the rollers to the housing may be damaged.

SUMMARY OF THE INVENTION

An aspect of the invention provides a roller capable of being easily elastically deformable while maintaining a desired level of abrasion resistance, and a clothes drying apparatus provided with the roller.

Accordingly, the present invention provides a clothes drying apparatus comprising: a housing to define an appearance of the clothes drying apparatus; a drying tub rotatably mounted in the housing; rollers to elastically support the drying tub, each of the rollers being in contact with the drying tub at a peripheral edge surface thereof; and an impact absorption enhancer to cause the rollers to be easily elastically deformed when impact is transmitted thereto from the drying tub, thereby enhancing absorption of the impact by the rollers.

In an aspect of the invention, the impact absorption enhancer comprises a plurality of impact absorption enhancing grooves provided at a peripheral portion of each of the rollers.

In an aspect of the invention, each of the rollers comprises a hinge section to rotatably mount the roller to the housing, and an annular elastic section arranged around the hinge section, and made of an elastically-deformable material. The elastic section may be provided with the impact absorption enhancing grooves at a peripheral portion thereof.

In an aspect of the invention, each of the impact absorption enhancing grooves extends axially along a peripheral surface of the roller.

In an aspect of the invention, the impact absorption enhancing grooves are arranged at a peripheral surface of the roller while being substantially uniformly circumferentially spaced apart from one another.

In an aspect of the invention, the impact absorption enhancer comprises a plurality of impact absorption enhancing holes provided at a peripheral portion of each of the rollers to extend axially throughout the roller.

In an aspect of the invention, the impact absorption enhancing holes are arranged at the peripheral portion of the roller while being substantially uniformly circumferentially spaced apart from one another.

In accordance with another aspect of the invention, the present invention provides a roller to rotatably and elastically support an object having a weight while being elastically deformable to absorb impact transmitted thereto from the object, the roller being provided with an impact absorption enhancer at a peripheral portion thereof to enhance the impact absorption.

In an aspect of the invention, the impact absorption enhancer comprises a plurality of impact absorption enhancing grooves provided at the peripheral portion of the roller.

In an aspect of the invention, the roller comprises a hinge section to rotatably mount the roller, and an annular elastic section arranged around the hinge section, and made of an elastically-deformable material. The elastic section may be provided with the impact absorption enhancing grooves at a peripheral portion thereof.

In an aspect of the invention, each of the impact absorption enhancing grooves extends axially along a peripheral surface of the roller.

In an aspect of the invention, the impact absorption enhancing grooves are arranged at a peripheral surface of the roller while being substantially uniformly circumferentially spaced apart from one another.

In an aspect of the invention, the impact absorption enhancer comprises a plurality of impact absorption enhancing holes provided at the peripheral portion of the roller to extend axially throughout the roller.

In an aspect of the invention, the impact absorption enhancing holes are arranged at the peripheral portion of the roller while being uniformly circumferentially spaced apart from one another.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
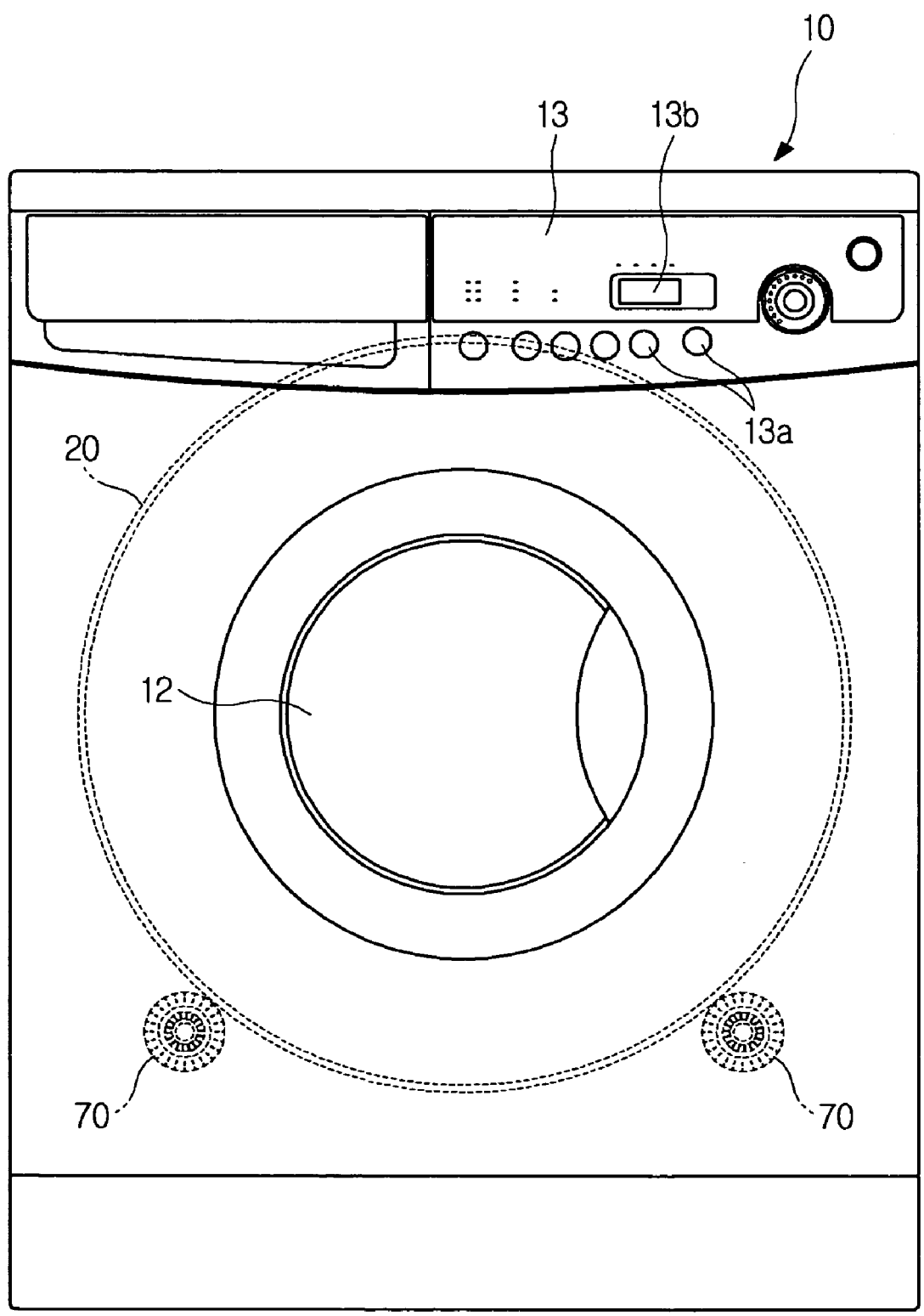
FIG. 1 is a front view schematically illustrating a configuration of a clothes drying apparatus according to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
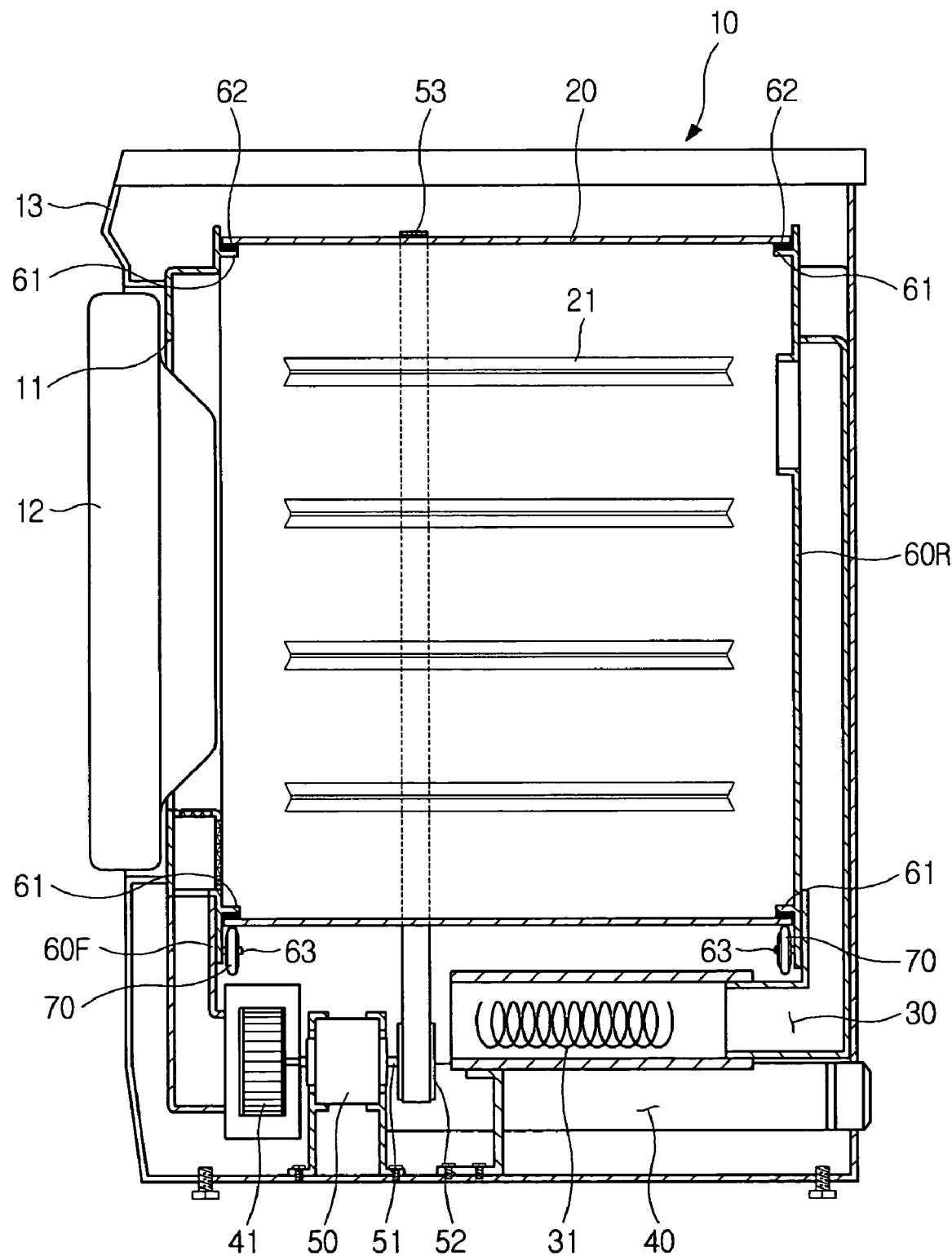
FIG. 2 is a sectional view of the configuration of the clothes drying apparatus according to the present invention.

Referring to FIGS. 1 and 2, a clothes drying apparatus according to an embodiment of the present invention is illustrated. The clothes drying apparatus includes a housing 10 to define the appearance of the clothes drying apparatus, a cylindrical drying tub rotatably mounted in the housing 10 while having a drum shape, a hot air intake duct 30 to guide hot air into the cylindrical drying tub 20, and a hot air exhaust duct 40 to guide exhaustion of the hot air from the drying tub 20.

The housing 10 is provided, at a front wall thereof, with an access opening 11 through which clothes, to be dried, may be placed into the drying tub 20 or taken out from the drying tub 20. A door 12 is hingably coupled to the front wall of the housing 10 such that the door 12 opens and closes the access opening 11. A control panel 13 is provided at an upper portion of the front wall of the housing 10. The control panel 13 includes operating buttons 13a to control operations of driving elements included in the clothes drying apparatus, respectively, and a display 13b to display the operations of the driving elements.

The hot air intake duct 30 is provided, in the interior thereof, with a heater 31 to heat air flowing through the hot air intake duct 30, thereby generating a flow of hot air. The hot air intake duct 30 is opened at one end thereof while being connected, at the other end thereof, to the drying tub 20, so as to supply hot air into the drying tub 20. The hot air exhaust duct 40 is provided, at an intermediate portion thereof, with a blowing fan 41 to generate a suction force, and thus, a blowing force. With these configurations, hot air generated by the heater 31 passes through the hot air intake duct 30, drying tub 20, and hot air exhaust duct 40, in this order, and is then externally exhausted.

The drying tub 20 is arranged in the housing 10 while being rotatably supported by the housing 10. A drive motor 50 is mounted in the housing 10 while being arranged at a lower portion of the housing 10. The drying tub 20 receives a rotating force from the drive motor 50 via a belt 53, so that it is rotated. The drive motor 50 also rotates the blowing fan 41 simultaneously with the drying tub 20. To this end, the drive motor 50 includes a rotating shaft 51 extending from the drive motor 50 in opposite axial directions. The blowing fan 42 is directly connected to one portion of the rotating shaft 51. A pulley 52 is mounted to the other portion of the rotating shaft 51. The pulley 52 is connected to the drying tub 20 via the belt 53, which is wound around the drying tub 20 and pulley 52. Accordingly, the pulley 52 transmits the rotating force from the drive motor 50 to the drying tub 20 via the belt 53. Thus, the drying tub 20 and blowing fan 41 may simultaneously be rotated by the drive motor 50.

Lifters 21 are provided at an inner surface of the drying tub 20 such that they are radially inwardly protruded. The lifters 21 serve to raise clothes contained in the drying tub 20 to the top of the drying tub 20, and then to release the clothes to cause the clothes to be dropped to the bottom of the drying tub 20.

A front bracket 60F is mounted to the front wall of the housing 10 to cover a front side of the drying tub 20 while rotatably supporting a front end of the drying tub 20. A rear bracket 60R is mounted to a rear wall of the housing 10 to cover a rear side of the drying tub 20 while rotatably supporting a rear end of the drying tub 20. An annular support member 61 is protruded from each of the front and rear brackets 60F and 60R into the drying tub 20 to rotatably support the drying tub 20. A frictional pad 62, having a low coefficient of friction, is provided at each annular support member 61. Thus, the drying tub 20 is supported, at opposite ends thereof, that is, front and rear ends thereof, by the support members 61 via the frictional pads 62. Accordingly, when the drying tub 20 receives a rotating force from the drive motor 50, the drying tub 20 is rotated while being slid, at the front and rear ends thereof, along respective surfaces of the frictional pad 62.

The hot air intake duct 30 is arranged on the rear bracket 60R such that the hot air intake duct 30 guides hot air into the drying tub 20. The hot air exhaust duct 40 is arranged on the front bracket 60F such that the hot air exhaust duct 40 exhausts hot air from the drying tub 20. Accordingly, hot air dries clothes contained in the drying tub 20 while flowing in the drying tub 20 from the rear side thereof to the front side thereof.

The clothes drying apparatus according to the illustrated embodiment of the present invention also includes rollers 70 to elastically support the drying tub 20 when an excessive amount of clothes is contained in the drying tub 20. In the illustrated embodiment of the present invention, the rollers 70 are arranged in pairs at the front and rear brackets 60F and 60R such that support the front and rear ends of the drying tub 20 at opposite sides of the drying tub 20 the rollers 70.

Figure 3:
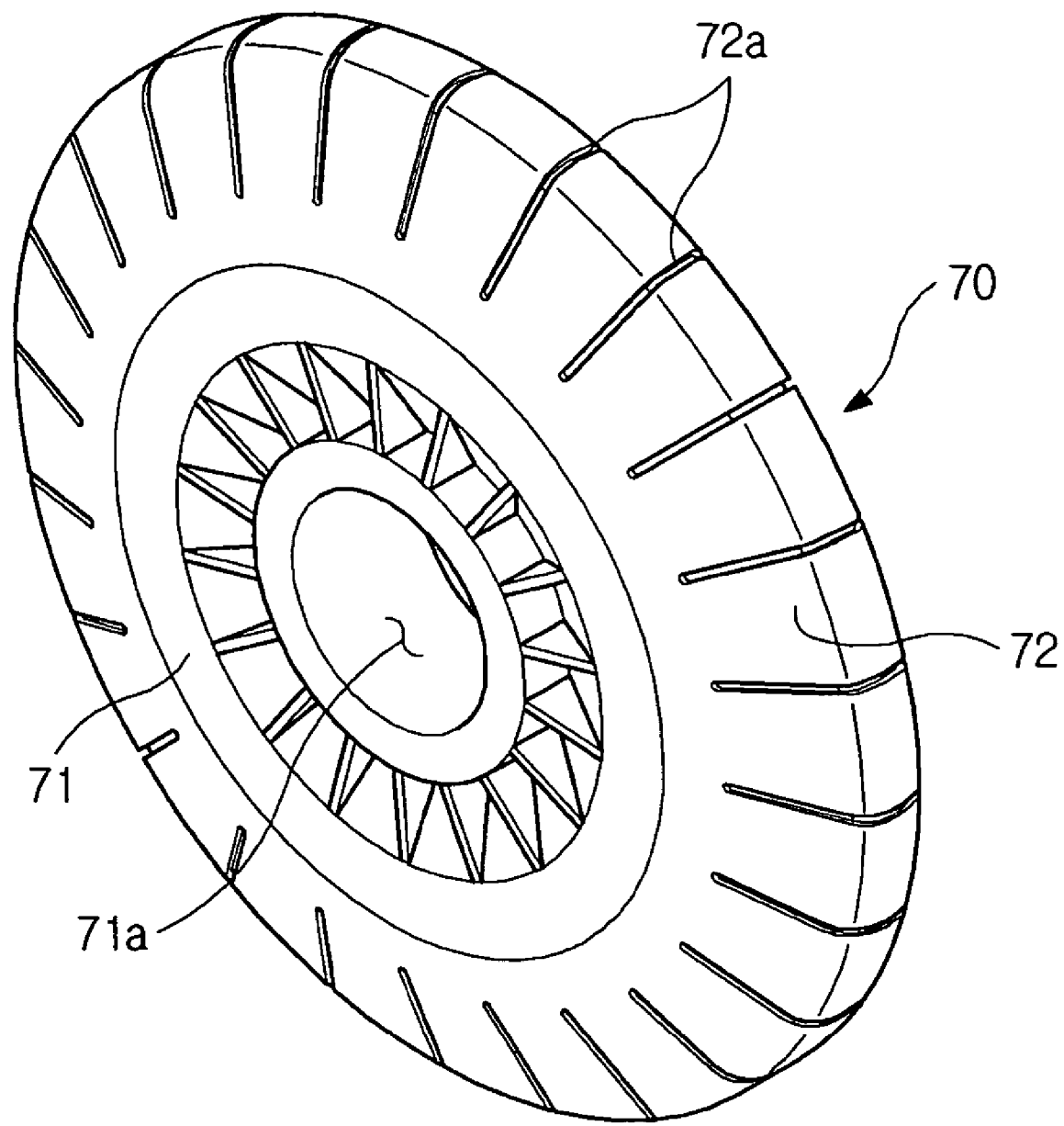
FIG. 3 is a perspective view illustrating a roller provided at the clothes drying apparatus in accordance with an exemplary embodiment of the present invention.

Each roller 70 is rotatably mounted to the associated front or rear bracket 60F or 60R. As shown in FIG. 3, for the rotatable mounting thereof, each roller 70 has a hinge section 71 centrally provided with a hinge hole 71a, and an annular elastic section 72 arranged around the hinge section 71, and made of a material having an elasticity, such as rubber, to absorb impact transmitted from the drying tub 20 to the roller 70, thereby elastically supporting the drying tub 20. Each of the front and rear brackets 60F and 60R is provided with hinge shafts 63 each to be fitted in the hinge hole 71a of an associated one of the rollers 70, so as to rotatably mount the associated roller 70 to the associated bracket.

Each roller 70 also has an impact absorption enhancer adapted to cause the roller 70 to be easily elastically deformed when impact from the drying tub 20 is transmitted to the roller 70, thereby enhancing absorption of the impact by the roller 70.

Figure 4:
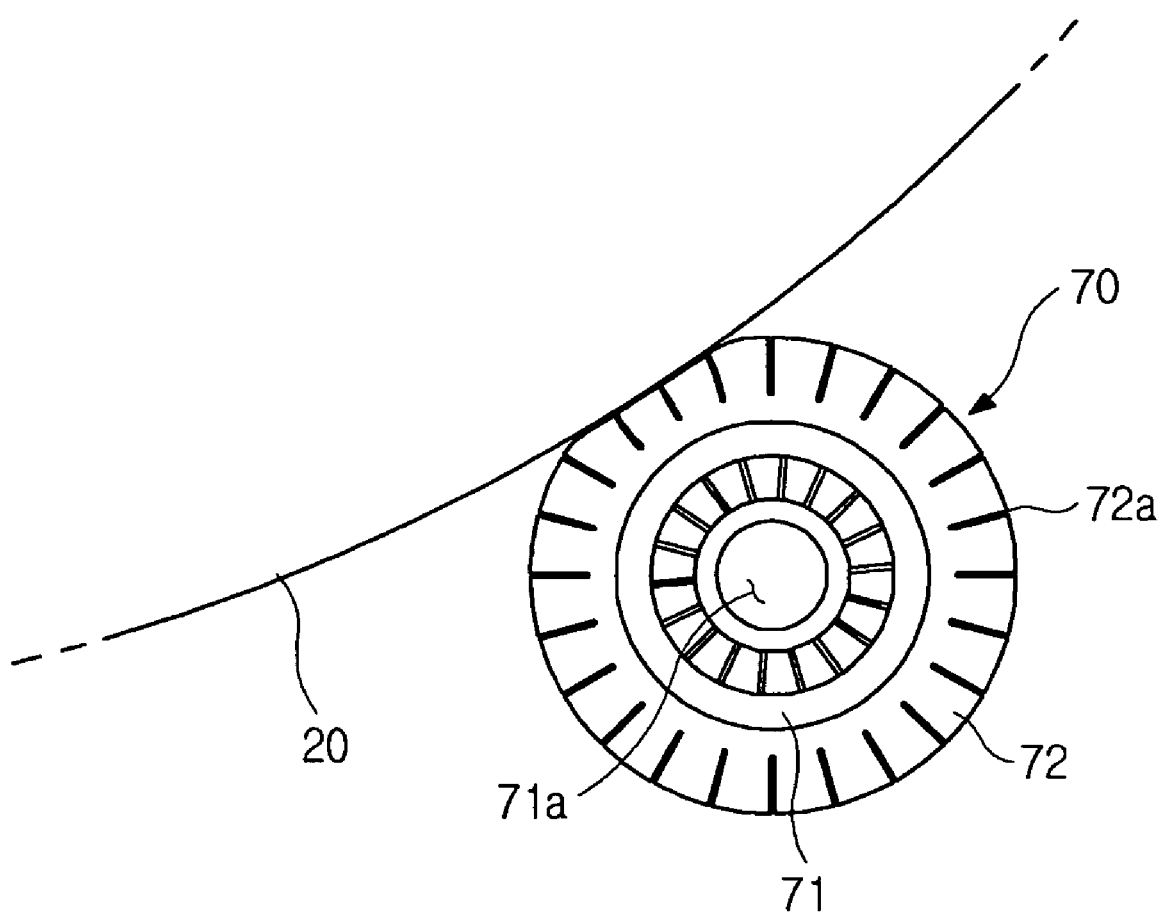
FIG. 4 is a schematic view illustrating a condition in which the roller of FIG. 3 is in contact with a drying tub.

As shown in FIG. 4, in accordance with the illustrated embodiment of the present invention, the impact absorption enhancer comprises a plurality of impact absorption enhancing grooves 72a provided at a peripheral portion of the elastic section 72 while being substantially uniformly spaced apart from one another in a circumferential direction of the elastic section 72. Each impact absorption enhancing groove 72a provides a space to allow the elastic section 72 to be elastically deformed. The elastic deformation of the elastic section 72 is mainly carried out at the impact absorption enhancing grooves 72a. Accordingly, the roller 70 may be more easily elastically deformed in comparison with conventional rollers.

As further shown in FIG. 4, in accordance with the illustrated embodiment of the present invention, each impact absorption enhancing groove 72a extends axially along a peripheral edge surface of the elastic section 72, while extending radially along opposite peripheral surfaces of the elastic section 72. Accordingly, the elastic section 72 of the roller 70 may be elastically deformed in both the radial and circumferential directions thereof, so that the roller 70 may more easily absorb impact transmitted thereto from the drying tub 20 in comparison with conventional rollers.

Figure 5:
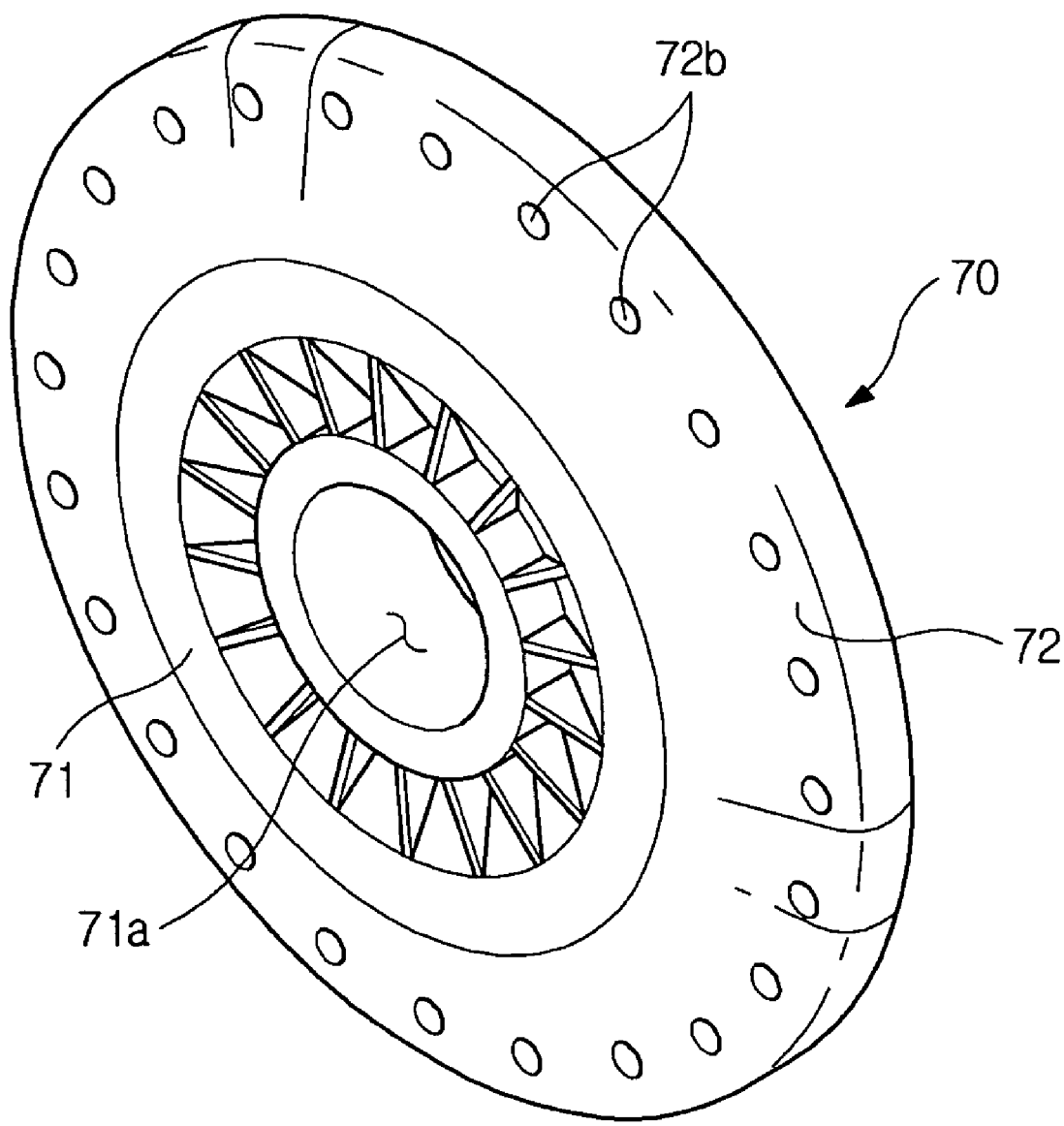
FIG. 5 is a perspective view illustrating a roller provided at the clothes drying apparatus in accordance with another exemplary embodiment of the present invention.
Figure 6:
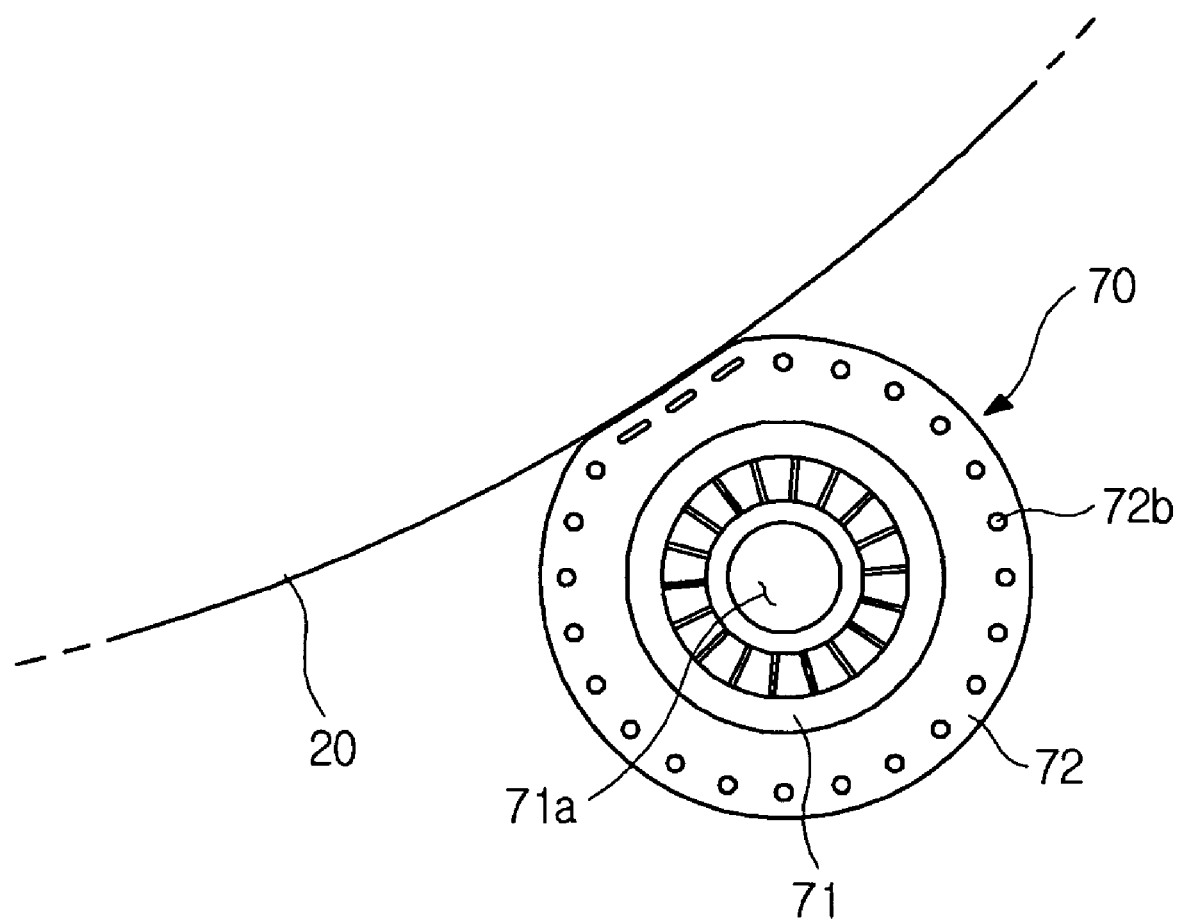
FIG. 6 is a schematic view illustrating a condition in which the roller of FIG. 5 is in contact with the drying tub.

Although the impact absorption enhancer comprises the impact absorption enhancing grooves 72a provided at the peripheral portion of the roller 70 in accordance with the illustrated embodiment of the present invention, the invention is not limited in structure and opertion thereto. For example, as shown in FIGS. 5 and 6, the impact absorption enhancer may comprise a plurality of impact absorption enhancing holes 72b provided at the peripheral portion of the elastic section 72 while being substantially uniformly spaced apart from one another in the circumferential direction of the elastic section 72. In this case, each impact absorption enhancing hole 72b provides a space to allow the elastic section 72 to be elastically deformed, so that the roller 70 may be more easily elastically deformed. Where each impact absorption enhancing hole 72b extends axially throughout the thickness of the elastic section 72, the roller 70 may be uniformly elastically deformed in a thickness direction thereof.

Although the rollers 70 are rotatably mounted to the front and rear brackets 60F and 60R fixed to the housing 10 in accordance with the illustrated embodiment of the present invention, they may be directly mounted to the front and rear walls of the housing 10 at the inside of the housing 10.

The operation, of the clothes drying apparatus having the above described configuration according to the present invention will now be described.

When a dry cycle is executed under the condition in which the door 12 has been closed after wet clothes have been placed into the drying tub 20, the heater 31 and drive motor 50 are driven. As the blowing fan 41 is operated, air is introduced toward the heater 31 which, in turn, heats the introduced air. Thus, hot air is generated. The hot air is introduced into the drying tub 20 via the hot air intake duct 30, and then is externally discharged via the hot air exhaust duct 40 after evaporating moisture of the wet clothes in accordance with the suction and blowing force of the blowing fan 41. Thus, the clothes are dried.

Meanwhile, the drying tub 20 is continuously rotated during the above drying cycle as the drying tub 20 receives a rotating force from the drive motor 50 via the belt 53. As the drying tub 20 rotates, the clothes contained in the drying tub 20 are repeatedly raised and dropped by the lifters 33a, so that they are uniformly dried.

Where the amount of the clothes contained in the drying tub 20 is excessive, impact having a level over an appropriate level is transmitted to the rollers 70. Even in this case, each roller 70 may effectively absorb the impact because the impact absorption enhancing grooves 72a or impact absorption enhancing holes 72b provide spaces to allow the elastic section 72 to be elastically deformed, so that the elastic section 72 is more easily elastically deformable in comparison to conventional arrangements.

As is apparent from the above description, in the clothes drying apparatus according to the present invention, the impact absorption enhancer is provided at the peripheral portion of the elastic section of each roller to allow the elastic section to be easily elastically deformable. By virtue of the impact absorption enhancer, each roller absorbs impacts transmitted thereto from the drying tub while maintaining a desired level of hardness at the peripheral edge surface thereof which frictionally contacts with the drying tub, thereby exhibiting a high abrasion resistance at the peripheral edge surface.

Since each roller is easily elastically deformable, the area thereof which contacts with the drying tub is increased, so that reducing a slip phenomenon occurring between the roller and the drying tub is additionally possible.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A clothes drying apparatus comprising:
a housing to define an appearance of the clothes drying apparatus;
a drying tub rotatably mounted in the housing;
rollers to elastically support the drying tub, each of the rollers being in contact with the drying tub at a peripheral edge surface thereof; and
an impact absorption enhancer comprising a plurality of impact absorption enhancing grooves provided at a peripheral portion of each of the rollers to cause the rollers to be easily elastically deformed when an impact is transmitted thereto from the drying tub, thereby enhancing absorption of the impact by the rollers.

2. The clothes drying apparatus according to claim 1, wherein each of the rollers comprises a hinge section to rotatably mount the roller to the housing, and an annular elastic section arranged around the hinge section, and made of an elastically-deformable material, the elastic section being provided with the impact absorption enhancing grooves at a peripheral portion thereof.

3. The clothes drying apparatus according to claim 1, wherein each of the impact absorption enhancing grooves extends axially along a peripheral surface of the roller.

4. The clothes drying apparatus according to claim 1, wherein the impact absorption enhancing grooves are arranged at a peripheral surface of the roller while being substantially uniformly circumferentially spaced apart from one another.

5. A clothes drying apparatus, including a housing and a drying tub rotatably mounted in the housing, which may be subject to an impact during operation, the clothes drying apparatus comprising:

rollers, in contact with the drying tub at a peripheral edge surface thereof, to elastically support the drying tub; and impact absorption enhancers comprising a plurality of impact absorption enhancing grooves at a peripheral portion of each of the rollers to cause the rollers to be elastically deformed when the impact is transmitted thereto from the drying tub and to enhance absorption of the impact by the rollers.

6. The clothes drying apparatus according to claim 5, wherein each of the rollers comprises a hinge section to rotatably mount the roller to the housing, and an annular elastic section arranged around the hinge section, which comprises an elastically-deformable material, and which is provided with the impact absorption enhancing grooves at a peripheral portion thereof.

7. The clothes drying apparatus according to claim 6, wherein each of the impact absorption enhancing grooves extends axially along a peripheral surface of the annular elastic section.

8. The clothes drying apparatus according to claim 6, wherein the impact absorption enhancing grooves are arranged at a peripheral surface of the annular elastic section while being substantially uniformly circumferentially spaced apart from one another.

* * * * *